United States Patent [19]

Noreika et al.

[11] 3,974,139

[45] Aug. 10, 1976

[54] DIETHYLAMINOHYDROXYPROPYL CELLULOSE I OR II AND A METHOD FOR PREPARING SAME

[76] Inventors: Rimas-Kazimeras Mechislovo Noreika, ulitsa Mitskevichaus,39,kv.206; Juozas-Romanas Juozo Musnitskas, prospekt 50 letiya SSSR,33,kv.97; Iolanta Vladimiro Lesene, ulitsa Poshkos,12,kv.1; Ionas Iona Zdanavichjus, prospekt Raudonosios Armies,35,kv.20, all of Kaunas, U.S.S.R.

[22] Filed: July 12, 1974

[21] Appl. No.: 488,297

[52] U.S. Cl. .................................. 536/84; 536/85
[51] Int. Cl.$^2$ ................. C08B 11/193; C08B 11/20
[58] Field of Search ..................... 260/232, 231 A

[56] References Cited
UNITED STATES PATENTS

| | | | |
|---|---|---|---|
| 1,834,040 | 12/1931 | Ascherl et al. | 260/232 |
| 2,118,664 | 5/1938 | Bradshaw | 260/232 |

OTHER PUBLICATIONS

Chemical Abstracts, vol. 75, No. 12, Sept. 20, 1971, p. 78304v.
Bikales et al., Cellulose and Cellulose Derivatives, Part V, Wiley-Interscience, N.Y., N.Y., 1971 p. 748.
Chemical Abstracts, vol. 51, No. 10, May 25, 1957, pg. 7613h.
Chemical Abstracts, vol. 71, No. 2, July 14, 1969, pg. 4395w.
Chemical Abstracts, vol. 74, No. 24, June 14, 1971, pg. 127,289.
Chemical Abstracts, vol. 74, No. 24, June 14, 1971, p. 127,829k.

*Primary Examiner*—Ronald W. Griffin
*Attorney, Agent, or Firm*—Haseltine, Lake & Waters

[57] ABSTRACT

The invention relates to diethylaminohydroxypropyl derivatives of cellulose I or II having maximum weight percentage of nitrogen of 1.6 and 6.3 respectively, and having the power to sorb 7.5 – 14 and 11.5 – 36 per cent of water, respectively, at a temperature of 20°C and a relative humidity of 63 per cent. The invention relates also to the method for preparing these cellulose derivatives which consists in treating diethylaminohydroxypropyl derivatives of cellulose I or II having maximum weight percentage of nitrogen of 1.6 and 6.3 respectively and having the power to sorb a maximum of 7.3 or 11 per cent of water respectively, at a temperature of 20°C and relative humidity of 63 percent, with acetic acid or with its aqueous solutions, taking not less than 0.1 mole of acetic acid per mole of diethylaminohydroxypropyl groups. The proposed derivatives of cellulose have highly accessible structure, increased reactivity and lowered chromacity. They can be used in various branches of science and technology in the capacity of ion-exchange materials, for example, in separation and purification of biochemical objects, in the capacity of complexing agents, for example, in purification and concentration of metals, in the capacity of catalysts, etc..

10 Claims, No Drawings

DIETHYLAMINOHYDROXYPROPYL CELLULOSE I OR II AND A METHOD FOR PREPARING SAME

The invention relates to diethylaminohydroxypropyl derivatives of cellulose I (natural cellulose) or II, hydrated cellulose and more particularly to the method for preparing same.

Said derivatives of cellulose possess properties of bases and can be used in various branches of science and technology as ion-exchangers, e.g., for separation, isolation and purification of biochemical objects, as complexing agents, say, for purification and concentration of metals, as catalysts, etc.

Known in the prior art are diethylaminohydroxypropyl derivatives of cellulose I or II, featuring a maximum weight percentage content of nitrogen equal to 1.6 and 6.3, respectively. The power to sorb water vapor by these derivatives of cellulose I is not higher than 7.3 per cent, and by the derivative of cellulose II, not higher than 11 per cent at a temperature of 20°C and a relative humidity of 63 per cent (the sorption efficiency is calculated with reference to the weight of the air dried cellulose).

Also known are methods for preparing the above named diethylaminohydroxypropyl derivatives of cellulose I or II by processing cellulose with diethylepoxypropylamine with subsequent purification of the end product (by washing with water and extraction with organic solvents). In the known methods, the diethylaminohydroxypropyl derivative of cellulose I, containing nitrogen not more than 1.6 per cent by weight, is prepared by processing air-dried cotton cellulose with diethylepoxypropylamine in the presence of water, and the diethylaminohydroxypropyl derivative of cellulose II, containing nitrogen not more than 6.3 per cent by weight — by processing alkaline cellulose obtained with mercerizing alkali, by processing with diethylepoxypropylamine.

Disadvantages of the known diethylaminohydroxypropyl derivatives of cellulose are their insufficient structure accessibility for water vapor. Moreover, these derivatives of cellulose are colored to a significant degree.

Increased power to sorb water vapor, and hence accessibility of the structure of diethylaminohydroxypropyl derivatives of cellulose I, as well as of cellulose II, would improve the quality of these products, and would also extend the field of their application.

The disadvantage of the known methods for preparing diethylaminohydroxypropyl derivatives of cellulose is also that they do not yield products capable of sorbing (at a temperature of 20°C and at 63 per cent relative humidity) more than 7.3 per cent of water vapor, for cellulose I, or more than 11 per cent of water vapor for cellulose II. The dependence of the ability of said cellulose derivatives to sorb water vapor on the nitrogen content has extreme character, similar to that observed in cases with other cellulose derivatives (See, for example, 'Advances in chemistry of cellulose and starch'.

The object of this invention is to develop diethylaminohydroxypropyl derivatives of cellulose I or II having higher power with respect to sorption of water vapor.

Another object of the invention is to develop diethylaminohydroxypropyl derivatives of cellulose I or II having high accessibility of the structure and increased reactivity.

Still another object of the invention is to develop said derivatives of cellulose possessing lower chromacity.

Another object of the invention is to work out a method for preparing diethylaminohydroxypropyl derivatives of cellulose I or II, possessing the above named properties.

In accordance with these and other objects the invention consists of diethylaminohydroxypropyl derivatives of cellulose I or II, containing not more than 1.6 per cent by weight of nitrogen for structure modification I and not more than 6.3 per cent thereof for structure modification II, characterized in that the ability of these derivatives of cellulose to sorb water vapor is 7.5 – 14 per cent, and of modification II 11.5 – 36 per cent (at a temperature of 20°C and a relative humidity of 63 per cent).

The diethylaminohydroxypropyl derivatives of cellulose having increased ability to sorb water vapor, the nitrogen content being equal to that in the formerly known cellulose derivatives, are characterized by high accessibility of the structure, increased reactivity, for example, in reactions of acetylation, lower chromacity, and, as it has already been said, they can be used in various branches and science and technology.

The most preferred derivatives of cellulose according to the invention are the diethylaminohydroxypropyl derivatives of cellulose I or II, containing 1.6 or 6.3 per cent of nitrogen, respectively, characterized in that the ability of said cellulose derivatives of structure modification I to sorb water vapor is 14 per cent, and of derivatives of cellulose having structure modification II is 36 per cent at a temperature of 20°C and at a relative humidity of 63 per cent.

The proposed diethylaminohydroxypropyl derivatives of cellulose having the above named properties are prepared according to the invention, by processing diethylaminohydroxypropyl derivatives of cellulose I or II containing nitrogen not more than 1.6 or 6.3 per cent by weight respectively, and having the ability of absorbing water vapor in quantities not more than 7.3 or 11 per cent respectively at a temperature of 20°C and at a relative humidity of 63 per cent, with acetic acid or with its aqueous solutions. The required quantity of acetic acid, according to the invention is not less than 0.1 mole per mole of diethylaminohydroxypropyl groups.

It is recommended that diethylaminohydroxypropyl derivatives of cellulose I or II, containing 1.6 or 6.3 per cent by weight of nitrogen and possessing the power to sorb 5.6 – 5.7 or 9 per cent of water vapor at a temperature of 20°C and at a relative humidity of 63 per cent respectively, should be processed with acetic acid or with its aqueous solutions.

It is also recommended that the starting diethylaminohydroxypropyl derivatives of cellulose should be processed with acetic acid or its aqueous solutions taken in the quantity not less than one mole of acetic acid per mole of diethylaminohydroxypropyl groups.

If the end product, obtained as a result of processing the starting cellulose derivatives with acetic acid or with its solutions is not used immediately, it should be washed with water to remove the remainder of the acetic acid, and then dried at a temperature of 20°–30°C.

According to the invention, diethylaminohydroxypropyl derivatives of cellulose of various origin (for example, native or reclaimed cellulose) and of any form, e.g., in the form of fibers, paper, fabric, yarn, film, etc. can be processed with acetic acid or with its aqueous solutions. Both air-dried diethylaminohydroxypropyl cellulose derivatives, and those in the wet state prepared according to known methods can be processed. The intermediate step of drying can thus be avoided.

The method for preparing diethylaminohydroxypropyl derivatives of cellulose I or II, possessing increased ability to sorb water vapor, is realized as follows.

The starting diethylaminohydroxypropyl derivatives of cellulose I or II are mixed with acetic acid, or with its aqueous solution, taken in the quantity of not less than 0.1 mole, preferably not less than one mole of acetic acid, per mole of the diethylaminohydroxypropyl groups. In order to ensure uniform wetting of the cellulose material during processing with acetic acid or with its aqueous solutions, any ratio of liquid to the cellulose material can be used, but the molar ratio of acetic acid to diethylaminohydroxypropyl groups should remain not less than 0.1 : 1.

The concentration of acetic acid used for processing cellulose material does not play a decisive role in determining the sorbing power of the end product with respect to water vapor, and the concentration of the acid should therefore be selected depending on particular process conditions. For example, if the end product is intended for use as a starting material for further acetylation using glacial acetic acid (for activation, as a reaction medium) then the diethylaminohydroxypropyl derivatives of cellulose should preferably be processed with glacial acetic acid. In this case, fresh glacial acetic acid should be used at the acetylation step. If the end product is intended for use in aqueous media, diethylaminohydroxypropyl derivatives of cellulose should be processed with dilute solutions of acetic acid with subsequent washing with water to remove the acid.

The most substantial effect is produced by the concentration of the acid on the chromacity of the end products. Table 1 gives the data on the chromacity of various samples of diethylaminohydroxypropyl derivatives of cellulose before and after their treatment with acetic acid of various concentrations.

of the processing would be usually selected with respect to the practical conditions of the process.

If the end products, prepared by processing the starting cellulose derivatives with acetic acid or with its aqueous solutions are not to be used immediately after their preparation, they should be washed with water to remove acetic acid, and dried. The drying should preferably be carried out at a temperature of 20° – 30°C. Higher drying temperatures produce a negative effect on the power of the end product to sorb water vapor. For example, if diethylaminohydroxypropyl cellulose of structure modification I, prepared by processing air dried cotton cellulose with diethylepoxypropylamine in the presence of water, containing 1.6 per cent by weight of nitrogen, and processed with acetic acid or with its aqueous solutions according to the invention, is dried at room temperature, it can sorb 14 per cent of water vapor at a temperature of 20°C and at a relative humidity of 63 per cent, while it can only absorb 5.6 per cent of water vapor if the drying temperature is 95° – 100°C.

As has already been said, the method of the invention makes it possible to prepare diethylaminohydroxypropyl derivatives of cellulose having increased reactivity. Data in Table 2 show the positive effect of the processing with acetic acid or with its aqueous solutions on the reactivity of the cellulose derivatives in the reaction of acid acetylation. The samples tested were specimens of diethylaminohydroxypropyl cellulose of structure modification I containing 1.6 per cent by weight of nitrogen prepared by amination of air dried cotton cellulose with diethylepoxypropylamine in the presence of water. Part of the specimens, before acetylation, were processed with glacial acetic acid, while another part was acetylated without preliminary processing with acetic acid. Acetylation of the specimens was carried out by the heterogeneous method in a medium of benzene in the presence of 1.6 per cent (of the specimen weight) of free perchloric acid. Columns 2 and 3 of Table 2 should be decoded as this: in the denominator are given data obtained with acetylation of the specimens that were not processed according to the invention, while in the numerator are given the data obtained with specimens processed with glacial acetic acid.

Table 1

| Amination conditions for cotton cellulose with diethylepoxypropylamine | Nitrogen content, % by wt | Chromacity of sample | | |
|---|---|---|---|---|
| | | non-treated with acetic acid | after treatment with 2% acetic acid | after treatment with glacial acetic acid |
| In the presence of 20% NaOH at 95°C | 2.8 | brown | yellow | pale yellow |
| '' | 1.4 | pale brown | — | white |
| In the presence of water at 60°C | 1.0 | pale yellow | white | — |
| water at 95°C | 1.6 | yellow | pale yellow | white |

Processing with acetic acid or with its aqueous solutions does not affect the nitrogen content of the obtained product as compared with the nitrogen content of the starting diethylaminohydroxypropyl derivatives of cellulose.

The length of processing the starting derivatives of cellulose can be varied from several minutes to a few hours. Increasing the length of the processing does not affect the quantity of the obtained product. The length Table 2

| Length of acetylation, in minutes | Bonded acetic acid in acetylated specimens, % (w/w) | Solubility of acetylated specimens in methylene chloride, % |
|---|---|---|
| 180 | 53.0/54.3 | 26.7/47.3 |
| 240 | 53.6/55.2 | 28.7/65.3 |

For a better understanding of the invention it will be illustrated by practical examples of preparing diethylaminohydroxypropyl derivatives of cellulose I or II, having increased power to sorb water vapor. In examples that hereinafter follow, the power to sorb water vapor is characterized by equilibrated humidity at a temperature of 20°C and a humidity of 63 per cent, which is calculated with reference to the weight of air dried sample.

EXAMPLE 1

Diethylaminohydroxypropyl cellulose of yellow color, having structure modification I, containing 1.6 per cent by weight of nitrogen and having equilibrated humidity of 5.6 – 5.7 per cent, was prepared by amination of air-dried cotton cellulose with diethylepoxypropylamine in the presence of water, and then processed with glacial acetic acid taken in the quantity of 300 moles of acetic acid per mole of diethylaminohydroxypropyl groups (liquid modulus 20). The process was effected at room temperature, after which the product was washed with water to neutral reaction and dried at room temperature. The resultant product was fibrous material of white color, containing 1.6 per cent by weight of nitrogen and having equilibrated humidity of 14 per cent.

EXAMPLES 2, 3 and 4

Diethylaminohydroxypropyl derivatives of cellulose I, having various nitrogen contents and equilibrated humidity of 5.5 – 6 per cent were prepared by amination of air-dried cotton cellulose with diethylepoxypropylamine in the presence of water, and then were processed with a 10 per cent aqueous solution of acetic acid at the liquid modulus of 20 and at a temperature of 25°C. The reaction products were then washed with water to neutral reaction and dried at a temperature of 25°C. The data on the nitrogen content of the starting material and of the end products, on the quantity of acetic acid in moles ($M_{AcOH}$) per mole of diethylaminohydroxypropyl groups, and also on the equilibrated humidity of the obtained product, are given in Table 3.

Table 3

| Example Nos. | Nitrogen content, in per cent (w/w) | $M_{AcOH}$ | Equilibrated humidity of product obtained by processing with acetic acid, % |
|---|---|---|---|
| 2 | 0.3 | 157 | 7.5 |
| 3 | 0.7 | 67 | 11 |
| 4 | 1.6 | 20 | 14 |

EXAMPLES 5, 6 and 7

Diethylaminohydroxypropyl cellulose having the structure modification I, containing 1.5 per cent nitrogen by weight, and having equilibrated humidity of 7.3 per cent, was prepared by amination of air-dried cotton cellulose with diethylepoxypropylamine in the presence of water, and then processed with acetic acid of various concentrations at the liquid modulus of 20 and at room temperature. The end product was washed with water to neutral reaction and dried at a temperature of 25°–30°C. The experimental data are given in Table 4.

Table 4

| Example No. | Concentration of acetic acid, % | $M_{AcOH}$ |
|---|---|---|
| 5 | 2 | 6.2 |
| 6 | 10 | 31 |
| 7 | 100 (glacial) | 310 |

The end product contained 1.5 per cent by weight of nitrogen and its equilibrated humidity was 13.9 per cent.

EXAMPLES 8, 9, 10 and 11

Diethylaminohydroxypropyl derivatives of cellulose II containing various quantities of nitrogen and moisture, prepared by amination of cotton alkaline (16 per cent of NaOH) cellulose with diethylepoxypropylamine, were processed with a 10 per cent solution of acetic acid at the liquid modulus of 20 and at room temperature. The products of the reaction were washed with water to neutral reaction and dried at room temperature. The experimental data on the nitrogen content of the starting materials and end products, and on the quantities of acetic acid ($M_{AcOH}$) per mole of diethylaminohydroxypropyl groups, and also on the equilibrated humidity of the starting materials and end products are given in Table 5.

Table 5

| Ex. No. | Nitrogen content, %(w/w) | $M_{AcOH}$ | Equilibrated humidity, % starting material | Equilibrated humidity, % after processing with acetic acid solution |
|---|---|---|---|---|
| 8 | 0.2 | 238 | 11 | 11.5 |
| 9 | 2.2 | 21 | 10.8 | 20 |
| 10 | 3.8 | 12 | 10 | 27 |
| 11 | 6.3 | 7.4 | 9 | 36 |

EXAMPLES 12, 13 and 14

Diethylaminohydroxypropyl cellulose of modification II containing nitrogen in the quantity of 4.9 per cent by weight and having equilibrated humidity of 10 per cent, was prepared by amination of cotton alkaline (20 per cent of NaOH) cellulose with diethylepoxypropylamine, and then was processed with acetic acid of various concentrations at the liquid modulus of 20 and at room temperature. The end products were washed with water to neutral reaction and dried at room temperature. The experimental data are given in Table 6.

Table 6

| Example No. | Acetic acid concentration, % | $M_{AcOH}$ |
|---|---|---|
| 12 | 2 | 1.9 |
| 13 | 10 | 9.5 |
| 14 | 100 (glacial) | 95 |

The end product contained 49 per cent by weight of nitrogen and 34 per cent of moisture.

EXAMPLE 15

Diethylaminohydroxypropyl cellulose of structure modification II containing 4.9 per cent nitrogen and 11 per cent moisture was prepared by amination of viscose staples with diethylepoxypropylamine in the presence of water, and then processed with a 2 per cent aqueous solution of acetic acid (one mole of acetic acid per mole of diethylaminohydroxypropyl groups). The liquid modulus was 20 and the process was carried out at room temperature. The end product was then washed with water to neutral reaction and dried at room temperature. The resultant product contained nitrogen in the quantity of 4.9 per cent by weight and 27 per cent of moisture.

EXAMPLES 16 and 17

Diethylaminohydroxypropyl cellulose similar to that described in Examples 12, 13 and 14, was processed with aqueous solutions of acetic acid of various concentrations at the liquid modulus of 10 and at room temperature. The reaction product was then washed with water to neutral reaction and dried at room temperature. The experimental data are given in Table 7.

Table 7

| Ex. No. | Concentration of acetic acid, % | $M_{AcOH}$ with acetic acid, % | Equilibrated humidity of product obtained by processing |
|---|---|---|---|
| 16 | 1.2 | 0.6 | 23 |
| 17 | 0.17 | 0.1 | 12 |

Examples 18 and 19 illustrate increased reactivity of the cellulose derivatives after their treatment with acetic acid or with its aqueous solutions.

EXAMPLE 18

Diethylaminohydroxypropyl cellulose prepared as described in Example 1 (except that it was not washed free from acetic acid or dried) was acetylated by the known method of heterogeneous acetylation in a medium of benzene in the presence of perchloric acid. After replacing the spent acid by glacial acetic acid, and after keeping the specimen under conditions accepted for activation of cellulose by glacial acetic acid, the specimen was titrated with a 0.1 N solution of perchloric acid in glacial acetic acid in the presence of crystal violet (neutralization of amino groups), then dehydrated, and treated with 80 per cent of an acetylating mixture containing 76.8 per cent by weight of benzene and 23.2 per cent by weight of acetic anhydride. The remaining 20 per cent of the acetylating liquid was added together with perchloric acid as a catalyst, which was added in the quantity of 1.6 per cent of the specimen weight. After acetylation for four hours at a temperature of 30°C at the liquid modulus of 44, perchloric acid was neutralized by a 10 per cent solution of potassium carbonate in glacial acetic acid and the product was washed with water. The end product contained 55.2 per cent by weight of bound acetic acid (the degree of hydroxy group conversion 0.96) and 0.8 per cent by weight of nitrogen. The solubility of the product in methylene chloride, 65.3 per cent.

EXAMPLE 19

Diethylaminohydroxypropyl cellulose prepared as described in Example 1 (except that a 10 per cent aqueous solution of acetic acid was used) was activated and acetylated by the method described in Example 18, except that perchloric acid was added with the second portion of the acetylating mixture to perform two roles, viz., of a neutralizing agent for the amino groups, and of a catalyst in the reaction. The end product contained 55.2 per cent by weight of bound acetic acid and 0.8 per cent by weight of nitrogen. The solubility of the product in methylene chloride was 71.0 per cent.

We claim:

1. A method for preparing diethylaminohydroxypropyl cellulose having a maximum weight percentage of nitrogen of 1.6 and 6.3 respectively, and having the power to sorb 7.5 – 14 and 11.5 – 36 per cent of water vapor respectively at a temperature of 20°C and at a relative humidity of 63 per cent, comprising processing diethylaminohydroxypropyl cellulose, obtained by amination of natural cellulose or dehydrated cellulose with diethylepoxypropylamine in the presence of water, and having a maximum weight percentage of nitrogen of 1.6 and 6.3 respectively, and having the power to sorb a maximum 7.3 and 11 percent of water vapor respectively at a temperature of 20°C and at a relative humidity of 63 per cent, with acetic acid taking not less than 0.1 mole of acetic acid per mole of diethylaminohydroxypropyl groups, followed by washing to remove excess acetic acid.

2. A method according to claim 1, wherein the diethylaminohydroxypropyl cellulose which are processed with acetic acid have the power to sorb 5.6 – 5.7 and 9 per cent of water vapor respectively at a temperature of 20°C and at a relative humidity of 63 per cent.

3. A method according to claim 1, wherein the acetic acid is used in an amount of not less than one mole of acetic acid per mole of diethylaminohydroxypropyl groups.

4. Diethylaminohydroxypropyl cellulose obtained from natural cellulose or hydrated cellulose, having a maximum weight percentage of nitrogen of 1.6 and 6.3 respectively, and having the power to sorb 7.5 – 14 and 11.5 – 36 per cent of water vapor respectively at a temperature of 20°C and at a relative humidity of 63 per cent and prepared by the method of claim 1.

5. Diethylaminohydroxypropyl cellulose obtained from natural cellulose or hydrated cellulose, containing 1.6 and 6.3 per cent by weight of nitrogen respectively and having the power to sorb 14 and 36 percent of water vapor respectively at a temperature of 20°C and at a relative humidity of 63 per cent, and prepared by the method of claim 1.

6. A method for preparing diethylaminohydroxypropyl cellulose having a maximum weight percentage of nitrogen of 1.6 and 6.3 respectively, and having the power to sorb 7.5 – 14 and 11.5 – 36 per cent of water vapor respectively at a temperature of 20°C and at a relative humidity of 63 per cent, comprising processing diethylaminohydroxypropyl cellulose obtained by amination of natural cellulose or hydrated cellulose with diethylepoxypropylamine in the presence of water, and having a maximum weight percentage of nitrogen of 1.6 and 6.3 respectively and having the power to sorb a maximum of 7.3 and 11 per cent of water vapor respectively at a temperature of 20°C and at a relative humidity of 63 per cent, with an aqueous solution of acetic acid taking not less than 0.1 mole of acetic acid per mole of diethylaminohydroxypropyl groups, followed by washing to remove excess acetic acid.

7. A method according to claim 6, wherein the diethylaminohydroxypropyl celluloses which are processed with an aqueous solution of acetic acid, have the power to sorb 5.6 – 5.7 and 9 per cent of water vapor respectively, at a temperature of 20°C and a relative humidity of 63 per cent.

8. A method according to claim 6, wherein the aqueous solution of acetic acid is taken in an amount of not less than one mole of acetic acid per mole of diethylaminohydroxypropyl groups.

9. Diethylaminohydroxypropyl cellulose obtained from natural cellulose or hydrated cellulose, having a maximum weight percentage of nitrogen of 1.6 and 6.3 respectively, and having the power to sorb 7.5 – 14 and 11.5 – 36 per cent of water vapor respectively at a temperature of 20°C and at a relative humidity of 63 per cent and prepared by the method of claim 6.

10. Diethylaminohydroxypropyl cellulose obtained from natural cellulose or hydrated cellulose, containing 1.6 and 6.3 per cent by weight of nitrogen respectively and having the power to sorb 14 and 36 per cent of water vapor respectively at a temperature of 20°C and at a relative humidity of 63 per cent and prepared by the method of claim 6.

* * * * *